United States Patent
Wu (10) Patent No.: US 9,604,261 B2
(45) Date of Patent: Mar. 28, 2017

(54) MONITORING OF OPTICAL FIBER STRIPPING

(71) Applicant: CORNING OPTICAL COMMUNICATIONS LLC, Hickory, NC (US)

(72) Inventor: Qi Wu, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 10 days.

(21) Appl. No.: 14/755,474

(22) Filed: Jun. 30, 2015

(65) Prior Publication Data

US 2017/0001224 A1    Jan. 5, 2017

(51) Int. Cl.
*B08B 7/00* (2006.01)
*G02B 6/245* (2006.01)

(52) U.S. Cl.
CPC ............ *B08B 7/0085* (2013.01); *G02B 6/245* (2013.01)

(58) Field of Classification Search
CPC ......... B08B 7/0085; B08B 7/00; G02B 6/245; G02B 6/4497; G02B 6/125; G02B 6/44; G02B 6/05; Y10T 156/1153; Y10T 156/1939
USPC .... 134/19, 26, 35, 34, 37, 42; 156/708, 711, 156/752, 757, 923; 65/473, 424, 503, 509
See application file for complete search history.

(56) References Cited

U.S. PATENT DOCUMENTS

| | | | |
|---|---|---|---|
| 5,968,283 A | 10/1999 | Walraven et al. | 134/19 |
| 6,244,323 B1 | 6/2001 | Miller | 156/584 |
| 6,402,856 B1* | 6/2002 | Vetrano | C09K 5/00 134/19 |
| 6,436,198 B1 | 8/2002 | Swain et al. | |
| 7,003,985 B2 | 2/2006 | Swain et al. | 65/473 |
| 8,317,972 B2 | 11/2012 | Dunwoody et al. | 156/708 |
| 8,557,052 B2* | 10/2013 | Lambert | G02B 6/245 134/42 |
| 9,167,626 B1 | 10/2015 | Wu | |

OTHER PUBLICATIONS

Burst Technology for High Strength Optical Fiber Stripping, 3SAE Technologies, 2010, downloaded from internet search on Jun. 16, 2015, 3 pages.

(Continued)

*Primary Examiner* — Duy Deo
*Assistant Examiner* — Maki Angadi (57) ABSTRACT

An apparatus for removing a coating from a lengthwise section of an optical fiber includes a heater at least partially defining an elongate heating region configured for receiving the lengthwise section of the optical fiber, wherein the heater is configured for heating the heating region to a temperature above a thermal decomposition temperature of the at least one coating; a sensor configured for providing a signal indicative of explosive removal of the at least one coating from the lengthwise section of the optical fiber; and at least one device operatively associated with the sensor and the heater for receiving and processing the at least one signal from the sensor, and deactivating the heater. The at least one device may be configured for determining how much time passes between occurrence of the heater being deactivated and the at least one coating being removed from the lengthwise section of the optical fiber.

12 Claims, 7 Drawing Sheets

(56) References Cited

OTHER PUBLICATIONS

Noncontact Optical Fiber Coating Removal Technique With Hot Air Stream, Hyunsoo Park et al., Journal of Lightwave Technology, vol. 23, No. 2, Feb. 2005, 7 pages.
International Search Report and Written Opinion PCT/US2016/036796 Dated Sep. 20, 2016.

* cited by examiner

MONITORING OF OPTICAL FIBER STRIPPING

BACKGROUND

This disclosure generally relates to stripping optical fiber coatings and, more particularly, to methods and apparatus for non-contact stripping of optical fiber coatings.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or in the field (e.g., using a "field-installable" fiber optic connector).

Regardless of where installation occurs and the type of connector used, stripping of optical fiber coatings is typically an important step in terminating optical fibers in preparation for installing connectors. For both factory and field installations (and especially the latter), an inherently accurate and robust coating stripping tool can be of particular importance because the technicians or operators making the installations may have varying amounts of relevant training or experience.

A bare glass fiber and a 250 um coated optical fiber may appear indistinguishable to untrained eyes. Therefore, mechanical stripping can be challenging due to visibility issues. In addition, mechanical stripping may cause direct contact between tool blades and bare glass, which can cause flaws in the optical fibers and reduce their tensile strengths. Such flaws and reductions in tensile strength may be restricted through the use of non-contact stripping methods and apparatus. However, at least some of the non-contact stripping methods and apparatus are better suited for manufacturing settings rather than field settings and/or have other disadvantages.

There is a desire for fiber stripping methods and apparatus that provide a new balance of properties.

SUMMARY

An aspect of this disclosure is the provision of methods and apparatus for use in non-contact stripping of an optical fiber. As used herein, "an optical fiber" refers to one or more optical fibers such that the methods and apparatuses disclosed may be used to simultaneously and/or successively strip a plurality of optical fibers in a non-contact manner.

In accordance with an embodiment of this disclosure, an apparatus for removing at least one coating from a lengthwise section of an optical fiber comprises a heater at least partially defining an elongate heating region configured for receiving the lengthwise section of the optical fiber, wherein the heater may be configured for heating the heating region to a temperature above a thermal decomposition temperature of the at least one coating; a sensor configured for providing a signal indicative of explosive removal of the at least one coating from the lengthwise section of the optical fiber; and at least one device operatively associated with the sensor and the heater for receiving and processing the at least one signal from the sensor, and deactivating the heater. The at least one device may be at least one computer. The at least one computer may be configured to: identify, from the at least one signal, explosive removal of the at least one coating from the lengthwise section of the optical fiber; determine how much time passes between deactivation of the heater and explosive removal of the at least one coating from the lengthwise section of the optical fiber; provide a signal in response to any explosive removal of the at least one coating from the lengthwise section of the optical fiber not occurring within a predetermined time from deactivation of the heater; activate the heater to cause the heater to heat the heating region to the temperature above the thermal decomposition temperature of the at least one coating; and/or deactivate the heater at a predetermined time after the at least one device activates the heater.

In accordance with another embodiment, an apparatus for removing at least one coating from a lengthwise section of an optical fiber comprises a heater at least partially defining an elongate heating region configured for receiving the lengthwise section of the optical fiber, wherein the heater may be configured for heating the heating region to a temperature above a thermal decomposition temperature of the at least one coating; a sensor configured for providing a signal indicative of removal of the at least one coating from the lengthwise section of the optical fiber; and at least one device operatively associated with the heater and the sensor for deactivating the heater, and determining how much time passes between occurrence of the heater being deactivated and the at least one coating being removed from the lengthwise section of the optical fiber. The at least one device may be at least one computer configured, for example, as discussed above.

An aspect of this disclosure is the provision of a method for removing at least one coating from a lengthwise section of an optical fiber, wherein the method may comprise positioning the lengthwise section of the optical fiber in an elongate heating region; explosively removing the at least one coating of the lengthwise section from a remainder of the optical fiber, comprising operating a heater and heating the at least one coating of the lengthwise section of the optical fiber to a temperature above a thermal decomposition temperature of the at least one coating while the lengthwise section of the optical fiber is in the heating region; generating at least one signal indicative of the explosively removing of the at least one coating; processing the at least one signal; and deactivating the heater. The processing may be comprised of determining how much time passes between occurrence of the heater being deactivated and the explosively removing. The method may further include providing a signal if the amount of time which passes between occurrence of the heater being deactivated and the explosively removing is outside of a predetermined range.

In accordance with another aspect of this disclosure, a method, such as for removing at least one coating from a lengthwise section of an optical fiber, may comprise positioning the lengthwise section of the optical fiber in an elongate heating region; explosively removing the at least one coating of the lengthwise section from a remainder of the optical fiber, comprising operating a heater and heating the at least one coating of the lengthwise section of the optical fiber to a temperature above a thermal decomposition temperature of the at least one coating while the lengthwise section of the optical fiber is in the heating region; deactivating the heater; and determining how much time passes between occurrence of the heater being deactivated and the explosively removing. The deactivating of the heater may be comprised of deactivating the heater at a predetermined time after activation of the heater. The method may further include adjusting the predetermined time in response to the determining of how much time passes between occurrence of the heater being deactivated and the explosively removing.

Additional features and advantages will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, this description relates to an optical fiber stripping apparatuses and methods of stripping optical fibers, wherein the stripping may comprise a heat-induced burst or explosion.

Figure 1:
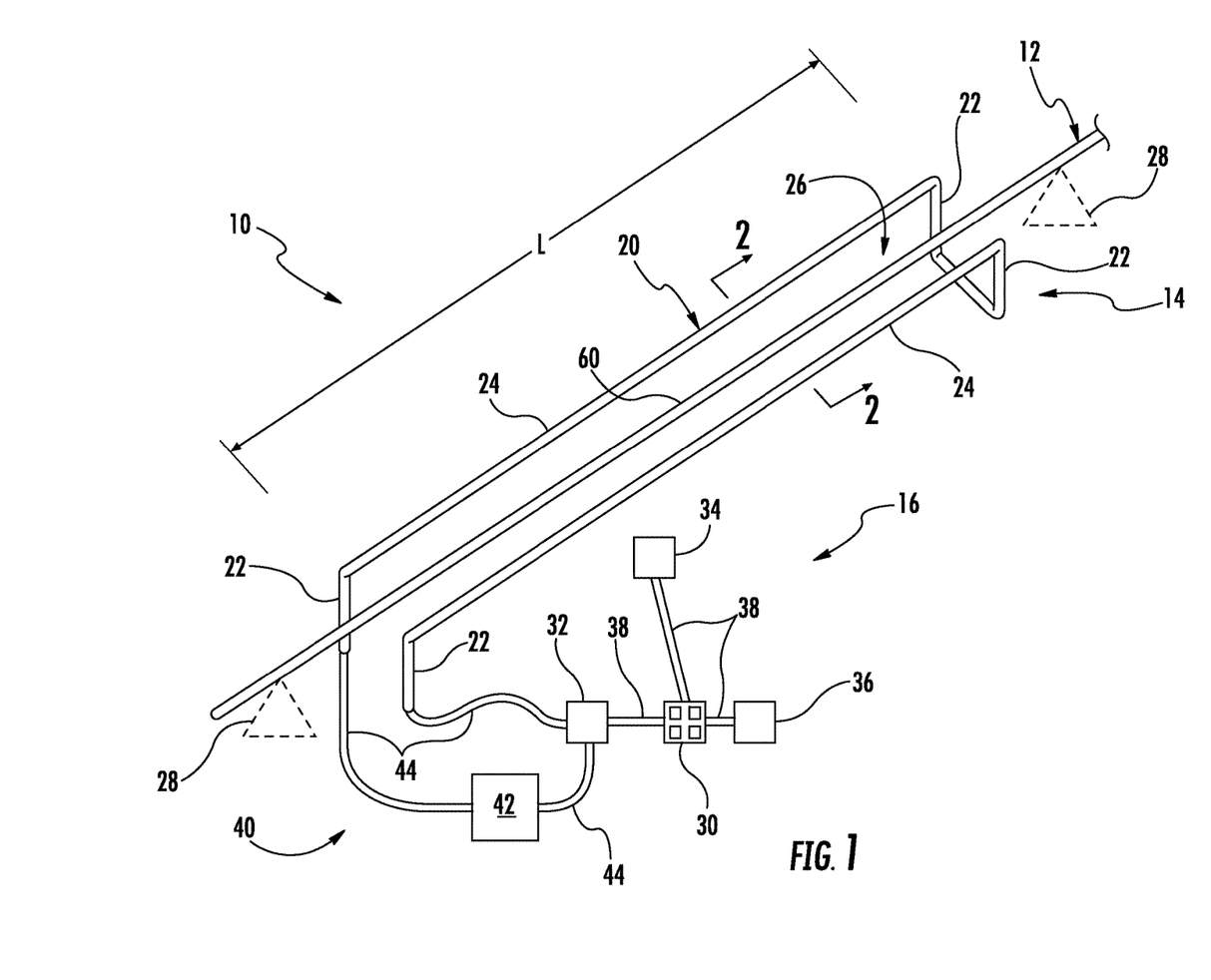
FIG. 1 is schematic perspective view of a length of unstripped optical fiber associated with an optical fiber stripping apparatus, in accordance with a first embodiment of this disclosure.

FIG. 1 illustrates a stripping apparatus 10 configured so that it can be used for explosively stripping away a length of at least one coating of an optical fiber 12, in accordance with a first embodiment of this disclosure. The stripping apparatus 10 may be generally described as a non-contract and non-air-stream thermal stripping system that includes features configured to provide non-invasive, real time monitoring of the stripping process. The stripping apparatus 10 includes a heater 14, and a control and monitoring system 16, wherein the control and monitoring system is configured for controlling operation of the heater and monitoring the stripping process.

As shown in FIG. 1, the heater 14 is a resistive heating element that is a piece of high-resistance electrical wire 20 that becomes very hot in response to the flow of electrical current therethrough. The metallic wire 20 can be in a bent configuration so that the heater 14 includes end sections 22 of the wire that support the main linear portions or elongate sections ("resistive sections") 24 of the wire. The resistive sections 24 function as electrical resistors that become hot when electrical current flows therethrough. The resistive sections 24 may be substantially parallel to one another, and they may also be arranged substantially radially symmetrically around a central axis of a heating region 26 through which the optical fiber 12 coaxially extends in FIG. 1. As schematically shown in FIG. 1, and discussed in greater detail below, one or more holding mechanisms 28 of the stripping apparatus 10 may be used to releasably hold or secure the optical fiber 12 in the heating region 56.

In FIG. 1, the control and monitoring system 16 is schematically shown as including at least one computer device 30, a circuit switch 32, at least one sensor 34, an activation switch 36, and electrical wiring 38 respectively connecting components of the control and monitoring system. The computer device 30 is schematically represented by a block containing a plurality of smaller blocks, wherein the smaller blocks schematically represent components such as, but not limited to, a user interface, processor, memory, analog-to-digital converter and/or other features that may be associated with computer devices. In the first embodiment, the sensor 34 is configured to detect the explosive stripping of the optical fiber 12 and provide a signal indicative of the explosive stripping. In some examples, it may be preferred for the sensor 34 to be an acoustic sensor; however, other suitable sensors can be used, as discussed in greater detail below.

The heater 14 and circuit switch 32 are parts of an electrical circuit 40 that also includes a battery 42 and electrical leads 44 respectively connecting components of the electrical circuit. The battery 42 and electrical leads 44 may be part of the control and monitoring system 16. The circuit switch 32 is configured for opening and closing the circuit 40 in response to signals from the computer device 30, or the like. The battery 42 is for providing electrical current to the heater 14 when the circuit switch 32 is closed. The battery 42 can also provide electrical power to components of the control and monitoring system 16 by way of appropriately configured electrical wiring.

In response to a user manually operating the activation switch 36, which may comprise an external push-button switch, icon, or the like, the computer device 22 may send a signal to the circuit switch 32 to cause it to close. The circuit switch 32 may remain closed for a predetermined period of time, so that the heater 14 operates to heat the heating region 56 in a manner that will explosively strip the optical fiber 12 extending therethrough. The sensor 34 and the computer device 22 are operatively associated with one another to provide non-invasive, real time monitoring of the stripping process, as discussed in greater detail below.

Figure 2:
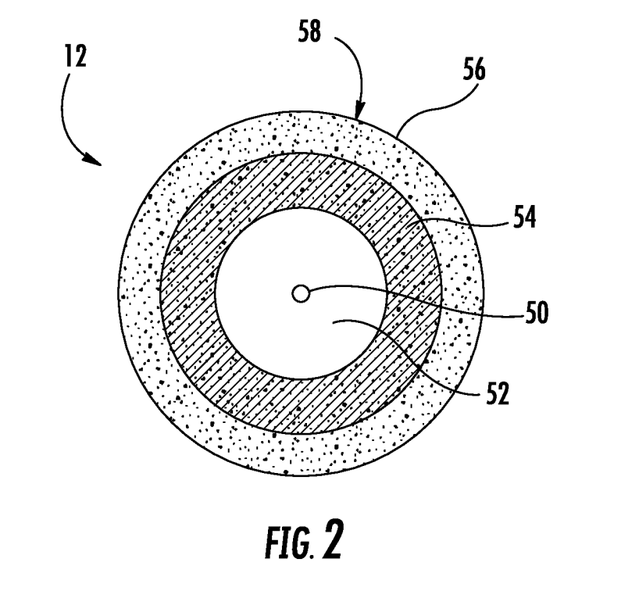
FIG. 2 is an isolated cross-sectional view of an example of an unstripped optical fiber, wherein the cross-section is taken along line 2-2 of FIG. 1.

Referring to FIG. 2, the optical fiber 12 can include a substantially cylindrical multi-layer coating 58 comprising substantially cylindrical polymer coatings 54, 56. The multi-layer coating 58 can comprise a dual-layer polymer coating 54, 56 that extends around a glass cladding 52 and glass core 50. The inner primary coating 54 may be configured to act as a shock absorber to minimize attenuation caused by any micro-bending of the fiber 12. The outer secondary coating 56 may be configured to protect the primary coating 54 against mechanical damage, and to act as a barrier to lateral forces. For example, the secondary coating 56 may have a diameter of about 200 um. The multi-layer coating 58 can further include a colored, thin ink layer for identification, and this additional layer may be coated onto the outer surface of the secondary coating 56. The outer diameter of the coated optical fiber 12 may be about 250 um. More specifically, the optical fiber 12 may include with an acrylate coating 58 having an outer diameter of 250 μm, and optionally the optical fiber may further include an additional colored ink layer. The ink layer may be about 5 μm thick.

In accordance with an embodiment of this disclosure, the cladding 52 and core 50 have a higher thermal decomposition temperature than the coatings 54, 56, and the primary coating 54 is softer than and has a lower thermal decomposition temperature than the secondary coating 56. A variety of polymeric materials are suitable for use as the primary and secondary coatings 54, 56. For example, the primary coating 54 may be soft UV-cured polymers, and the secondary coating 56 may be highly cross-linked UV-cured polymers. In one example, the primary coating 54 can have a thermal decomposition temperature of about 279° C., and the secondary coating 56 can have a thermal decomposition temperature of about 384° C., so that the difference in their thermal decomposition temperatures is about 100° C.

Referring to FIGS. 1 and 2, the heater 14 may be configured for facilitating substantially uniform heating over or along a lengthwise section ("fiber section") 60 of the optical fiber 12, for stripping the coatings 54, 56 from the fiber section 60, as discussed in greater detail below. Referring to FIG. 1, the heater 14 can be configured to have a length L, and the heating region 56 is about the same length L, so that the fiber section 60 that is stripped by the stripping apparatus 10 is about the same length L. The length L can be sufficient for many connector applications. For example, the length L can be about 12 mm. In addition, the length L can be longer or shorter than about 12 mm. For example, the length L may be at least about 8 mm, at least about 10 mm, at least about 12 mm, or about 15 mm or longer. For example, the length L may be within a range of from about 8 mm or about 10 mm to about 24 mm, from about 12 mm to about 24 mm, from about 12 mm to about 20 mm, or any other subranges therebetween.

With the coatings 54, 56 having different vaporization or thermal decomposition temperatures and the fiber section 60 positioned in the heating region 56 as discussed above, the heater 14 can be operated to rapidly heat the coatings 54, 56 of the fiber section 60 to a temperature that is above the thermal decomposition temperature of the primary coating 54 but below the thermal decomposition temperature of the secondary coating 56. As a result, the primary coating 54 of the fiber section 60 can decompose into gas and cause sufficient pressure to build up inside the secondary coating 56 of the fiber section 60 for causing an explosive rupture of the region encircled by the secondary coating 56 of the fiber section 60, without substantially damaging the cladding 52 or core 50 of the fiber 12.

An example of a method for stripping the coatings 54, 56 from the fiber section 60 is described in the following, in accordance with the first embodiment. The stripping apparatus 10 and the optical fiber 12 may be held with one or more of the holding mechanisms 28 so that the fiber section 60 extends substantially coaxially, or in another suitable configuration, through the heating region 56. Then, the stripping apparatus 10 can be operated, such as under the control of the computer device 22, in response to a user pressing the actuation switch 36, or the like, while the fiber section 60 extending through the heating region 56. As a result, the coatings 54, 56 of the fiber section 60 are rapidly heated to the temperature at which the secondary coating 56 bursts (e.g., in response to the vaporization of the primary coating 54). This heating can comprise quickly heating the heater 14 while the optical fiber 12 is in the heating region 56 to create a temperature field over the fiber section 60 that is substantially uniform. For example, the heater 14 may have a thermal mass that allows it to be rapidly heated to above 500° C., so that the coatings 54, 56 are heated to a temperature beyond the burst temperature, causing the vaporization of the primary coating 54 and bursting away of the secondary coating 56. The temperature of the multi-layer coating 58 can be rapidly raised to over 320° C. through natural convection and conduction to induce the bursting.

The stripping apparatus 10 is automatically operative, such as under the automatic control of the computer device 22, so that the heater 14 can be automatically deactivated or turned off shortly before, or not later than immediately after, the explosion that "strips" the coatings 54, 56 away from the fiber section 60. Quickly turning off the heater 14 in this manner seeks, for example, to avoid or at least minimize any oxidation and burning of the unstripped sections of the coatings 54, 56. The computer device 22 can be configured so that the heater 14 is automatically turned off or deactivated at a predetermined time, wherein the predetermined time may be a time within a range of from about 0.1 seconds to about 5 seconds after the heater is turned on or activated, a range of from about 0.75 seconds or about 1 second to about 3 seconds after the heater is turned on or activated, a range of from about one second or about 1.7 seconds to about 2.1 seconds after the heater is turned on or activated, or any other subranges therebetween. As a more specific example, the predetermined time may be about 1 second or about 1.9 seconds, or a time therebetween. The selection of the predetermined time at which the computer device 22 automatically turns off the heater 14 may depend upon factors associated with the configuration of the multi-layer coating 58 and/or the configuration of the stripping apparatus 10; therefore, the predetermined time may vary, and it may be determined based upon empirical evidence.

The heater 14 can be configured and operated, such as under the control of the computer device 22, so that the explosive stripping of the coatings 54, 56 occurs substantially simultaneously along the entire length L of the fiber section 60, and so that the temperature field throughout the heating region 56 may be substantially uniform, which can have the effect of maintaining the integrity of the secondary coating 56 until the burst temperature is reached. In contrast, an ununiform temperature field can lead to decomposition of the secondary coating 56, rendering it unable to contain sufficient vapor pressure for the desired explosion or bursting. Without the explosive stripping process, slow decomposition and oxidation of the coating 56 may generate harmful gas.

The fiber section 60 can be a mid-span of the optical fiber 12. When the fiber section 60 is a mid-span of the fiber 12, the lengthwise sections of the fiber 12 immediately adjacent to the mid span of the fiber section 60 can function as boundary structures that at least partially contain the pressure generated by the decomposing primary coating 54 of the fiber section 60, so that any leakage of the pressure from the fiber section 60 is restricted from escaping out of ends of the fiber section 60, so that the pressure is contained in a restricted area in a manner that seeks to provide the desired, controlled exploding and stripping of the coatings 54, 56 of the fiber section 60. As a contrasting example, when the fiber section 60 is an end section of the fiber 12, it may be the case that the pressure generated by the vaporizing primary coating 54 of the fiber section 60 escapes out the end of the fiber section 60, such that the stripping explosion may not occur. Instead, the coatings 54, 56 of the fiber section 60 may decompose or burn.

Figure 3:
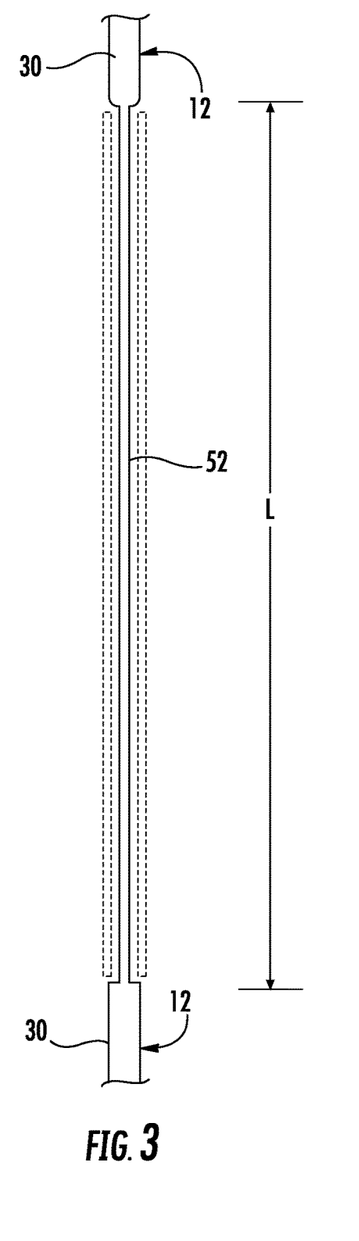
FIG. 3 is representative of schematic plan and side elevation views showing a length of at least one coating of the optical fiber being stripped or separated (e.g., exploding away) from the cladding of the optical fiber.
Figure 4:
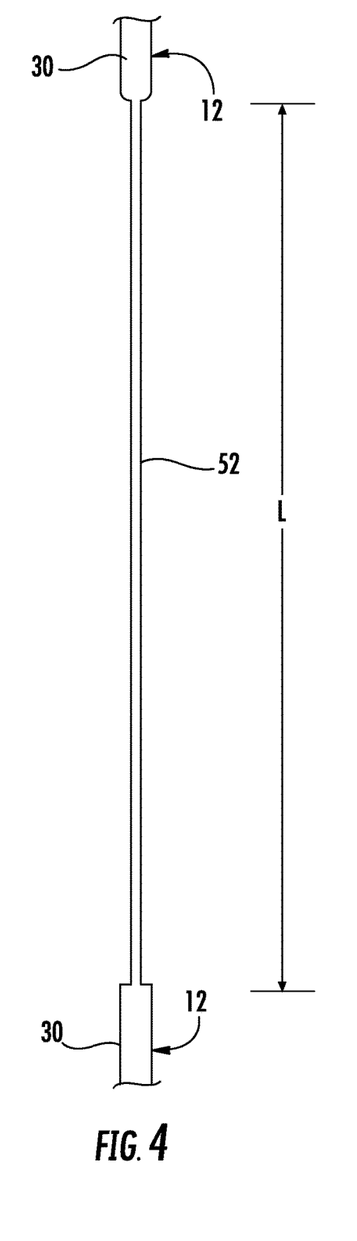
FIG. 4 is similar to FIG. 3, except for being illustrative of a state in which a mid-span of the optical fiber has been stripped.

In FIG. 3, substantially the entirety of the coatings 54, 56 of the fiber section 60 are shown being exploded away from the cladding 52 of the fiber section 60, wherein the stripping explosion is schematically represented by stippling. As shown in FIG. 4, the length L of the portion of the cladding 52 from which the coatings 54, 56 have been stripped can substantially match both the length of the heating region 56 and the length of the heater 14. The majority of the sections of the coatings 54, 56 that are stripped may bursts away from the cladding 52 substantially without generating smoke, and substantially without leaving carbon residue on the glass cladding 52.

In accordance with the first embodiment, the heater 14 is operated to rapidly heat the coatings 54, 56 of the fiber section 60 by way of natural convection and any associated conductive and radiant heat transfer. The stripping apparatus 10 of the first embodiment does not use forced convection to heat the coatings 54, 56, and the coatings are not heated in an inert gas environment. That is, the heater 14 is open to (e.g., in fluid communication with) the ambient environment during operation of the heater. However, a wide variety of other embodiments are within the scope of this disclosure. For example, alternative embodiments may optionally include forced convection and/or inert gas.

After the optical fiber 12 is stripped, the optical fiber may be removed from the stripping apparatus 10. Then, the optical fiber 12 may be installed to a fiber optic connector. A respective portion of the stripped optical fiber 12 will typically be cleaved or cut off. The stripping apparatus 10 can be periodically cleaned by running the heater 14 without an optical fiber 12 in the stripping apparatus, so that residual coatings may be at least partially removed from the heater.

Reiterating from above, the sensor 34 and the computer device 22 can be operatively associated with one another to provide non-invasive, real time monitoring of the stripping process. First, Second, Third and Fourth Examples of the stripping apparatus 10 and methods of operating the stripping apparatus are as discussed above, except for variations noted and variations that will be apparent to those of ordinary skill in the art. In the First through Fourth Examples: the wire 20 of the heater 14 is a length of 32 AWG chrome 60 wire having a resistance of 1.6Ω, the lateral spacing between the main resistive sections 24 of the heater is 1.5 mm, the length L of the heater and heating region 26 is 15 mm, the voltage of the battery 42 is 4.5 V, and the control of the resistive heater 14 is based on the amplitude (or duty cycle) and the duration of the electrical current pulse supplied to the heater, wherein the electrical current amplitude is fixed and only the duration of the electrical current pulse is varied.

Figure 5:
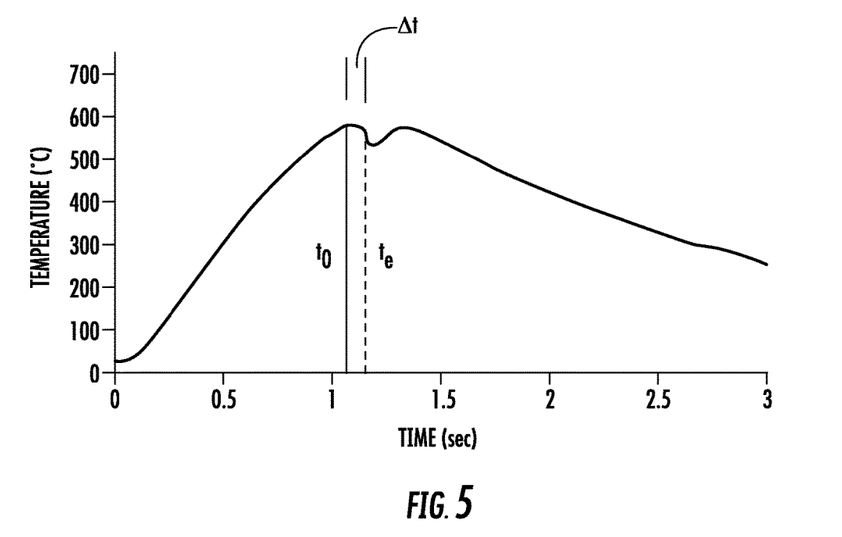
FIG. 5 is a chart illustrating temperature dynamics, a heater shutoff time, and an explosion time associated with an explosive stripping process performed by the optical fiber stripping apparatus, in accordance with an example.

In the First Example, the sensor 34 is a temperature sensor in the form of a K-type thermocouple with a 25 μm wire diameter which has a response time of less than 50 ms, and the temperature sensor is positioned in the heating region 26 and used to detect the temperature near the outer surface of the secondary coating 56 of the fiber 12 during the stripping process. For the First Example, FIG. 5 illustrates typical temperature dynamics proximate the outer surface of the secondary coating 56 of the fiber 12 during the above-discussed stripping method of the first embodiment. FIG. 5 illustrates a graph that may be generated by the computer device 30, by way of the computer device processing the signal from the temperature sensor 34, wherein the signal is indicative of the stripping explosion. The temperature profile line in FIG. 5 is based upon a digitized temperature signal derived from the analog signal from the temperature sensor 34 positioned in the heating region 26. The graph of FIG. 5, like the other graphs of this disclosure, may be displayed on the user interface of the computer device 30 and/or in any other suitable manner.

The graph of FIG. 5 also indicates a shutoff time $t_0$ for the heater 14 and the time at which the length L of the multi-layer coating 58 explodes ("explosion time") $t_e$. The computer device 30 may process a signal from the sensor 34 to determine the explosion time $t_e$, as will be discussed in greater detail below. Regarding the shutoff time $t_0$, in the First Example, the circuit switch 32, or the like, is opened so that the flow of electrical current to the heater 14 ceases before the moment of the stripping explosion of the multi-layer coating 58, because, for example, the thermal mass of the heater continues to transfer heat to the multi-layer coating after the flow of electrical current in the heater ceases. At least partially reiterating from above, the computer device 30 can be configured for deactivating the heater 14, such as by providing a signal to open the circuit switch 32, or the like, at the predetermined shutoff time $t_0$, wherein the shutoff time is known by the computer device. The computer device 30 may be configured so that the shutoff time $t_0$ is a variable that may be adjusted in response to feedback, wherein the feedback may comprise a time delay $\Delta t$ that is a function of the shutoff time $t_0$ and the explosion time $t_e$, as discussed in greater detail below. In one example, the time delay $\Delta t$ represents the amount of time that passes between deactivation of the heater 14 and the explosive removal of the length L of the multi-layer coating 58.

Figure 6:
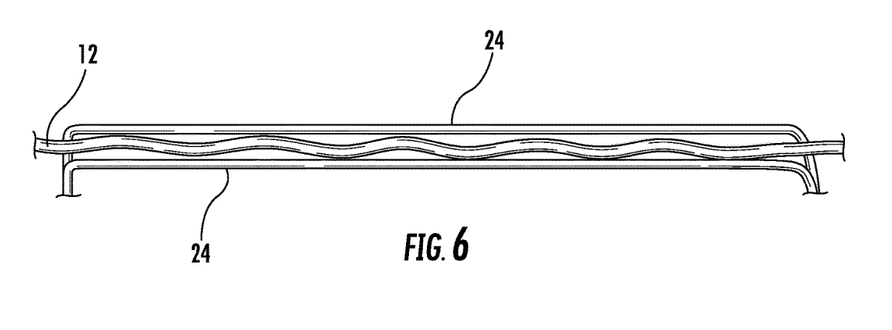
FIG. 6 is a side, top pictorial view showing an optical fiber positioned between resistive sections of a heater of the optical fiber stripping apparatus, wherein the at least one coating of the optical fiber is in a deformed state that occurs prior to completion of the explosive stripping process, in accordance with an example.

In the First Example, the operation of the heater 14 is comprised of a current pulse with an amplitude of 2.8 amps passing through the resistive heater wire 20 for a period of time that terminates at the shutoff time $t_0$. In response to the operation of the heater 14, as the temperature of the multi-layer coating 58 is increased to beyond thermal decomposition point of the primary coating 54: the primary coating is softened and bubbles are formed in the primary coating; and, because of the high modulus of the secondary coating 56, the secondary coating may not be expanded and/or significantly stretched, but the secondary coating may be deformed due to thermal expansion. More specifically, an undulating, wavy and/or substantially sinusoid-shaped deformation may become defined by the exterior surface of the secondary coating. This period in which the substantially sinusoid-shaped deformation occurs can last about 150 ms. FIG. 6 is a side, top pictorial view showing a fiber 12 between the resistive sections 24 of the heater 14, wherein the wavy, substantially sinusoid-shaped deformation in the secondary coating 56 is shown. Thereafter, the secondary coating 56 is exploded off of a remainder of the fiber 12 over the entire length L, wherein the duration of the stripping explosion is less than 100 µs.

The time at which the stripping explosion of the multi-layer coating 58 occurs can be determined by the computer device 30 monitoring the temperature change with the temperature sensor 34. Referring to FIG. 5, the explosion time $t_e$ is indicated by a characteristic decrease in the temperature being measured by the temperature sensor 34. The characteristic decrease in the temperature being measured by the temperature sensor 34, or the actual transient temperature drop, may be within a range of from about 10° C. to about 200° C., or any subranges therebetween.

The subject characteristic decrease in the temperature may be due to the release of the gasses from the decomposed primary coating 54, since these gasses are at a lower temperature than the air closely surrounding the multi-layer coating 58 immediately prior to the stripping explosion. The computer device 30 can be configured to identify the explosion time $t_e$ by processing the signal from the temperature sensor 34, such as by identifying the explosion time as being the point in time at which the temperature profile line in FIG. 5 exhibits a relatively rapid, characteristic decrease in the temperature being measured by the temperature sensor 34.

The time delay $\Delta t$ is a process parameter which can affect both the temperature (e.g., the maximum temperature) to which the multi-layer coating 58 is exposed and the amount of time to which the stripped fiber (i.e., the exposed cladding 52) is exposed to the elevated temperature. Generally reiterating from above, the computer device 30 can be configured to determine the time delay $\Delta t$ by determining both the shutoff time $t_0$ and the explosion time $t_e$, and then calculating a difference between the times $t_0$ and $t_e$. As another example, the computer device 30 may be configured to determine the time delay $\Delta t$ by activating a timer in response to the heater 14 being deactivated, and deactivating the timer in response to the explosive stripping of the length L of the multi-layer coating 58; and/or the computer device 30 may be configured to determine the time delay $\Delta t$ by activating a timer in response to the explosive stripping of the length L of the multi-layer coating 58, and deactivating the timer in response to the heater 14 being deactivated.

The Second and Third Examples are like the First Example, except for variations noted and variations that will be apparent to those of ordinary skill in the art. In the Second and Third Examples, the time delays $\Delta t$ are a positive delay of about 400 ms and a negative delay of about 100 ms, as respectively shown in FIGS. 7 and 8. That is, in the Third Example, as shown in FIG. 8, the heater 14 remains on for a period of time of about 100 ms after the length L of the multi-layer coating 58 is explosively stripped off of the associated length L of the cladding 52.

In the Third Example (FIG. 8), due to the reduced thermal load that exists after the length L of the multi-layer coating 58 has exploded, the air temperature within the heating region 26 continues to rise at a higher rate after the explosion as compared to the First Example (FIG. 5). The resulting high temperature and oxidizing environment in the heating region 26 can weaken (e.g., reduce the tensile strength of) the cladding 52 in the heating region.

Figure 7:
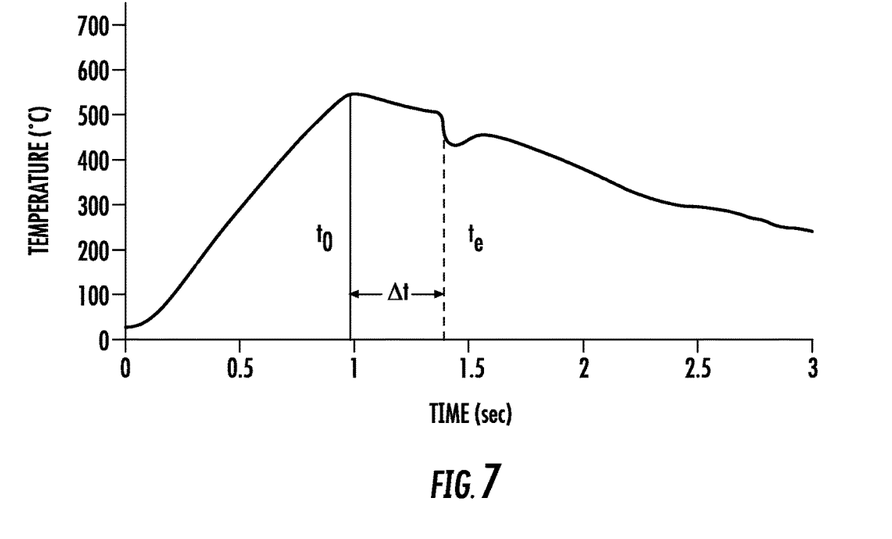
FIGS. 7 and 8 are charts similar to the chart of FIG. 5, except for being indicative of different examples.
Figure 8:
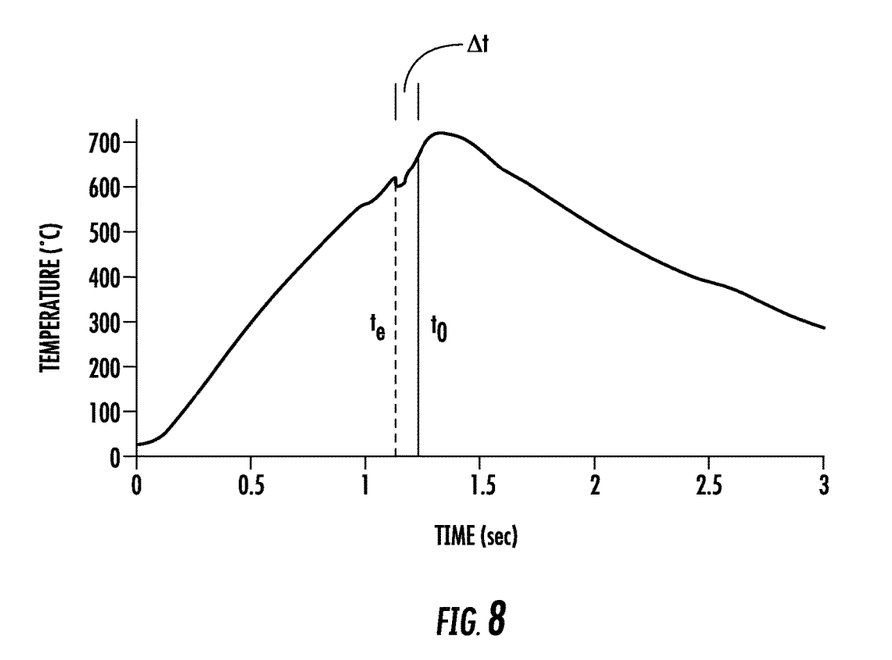

In the Second Example, as shown in FIG. 7, the time delay $\Delta t$ is relatively long, so that the exposed length L of the cladding 52 is exposed to a temperature nearly 100° C. lower than that in the First Example (FIG. 5). Although the resulting fiber tensile strength is relatively strong in the Second Example, the residual coating may not be completely removed. Accordingly, the time delay $\Delta t$ is indicative of both resultant fiber tensile strength and cleanliness.

In other examples, the sensor 34 for determining the timing of explosion of the multi-layer coating 58 may be a machine vision device comprising a very high speed camera with a frame rate matching the required time resolution (e.g., high speed video equipment). However, for at least some situations, it may not be practical for the sensor 34 to be a temperature sensor or high speed video equipment.

In the above-discussed method of the first embodiment, there typically is a clearly audible "pop" sound associated with the shock wave generated by the stripping explosion (e.g., the simultaneous out rushing of gas resulting from the decomposition of the primary coating 54 and the disintegration of the secondary coating 56). In the Fourth Example, the sensor 34 is an acoustic sensor configured for detecting the audible sound associated with the explosive stripping. More specifically, the above-discussed explosion of the multi-layer coating 58 comprises an acoustic signal, and the acoustic sensor 34 may be in the form of a consumer electronics microphone that is sufficiently sensitive to pick up the acoustic signal. The Fourth Example is like the First Example, except for variations noted and variations that will be apparent to those of ordinary skill in the art.

Figure 9:
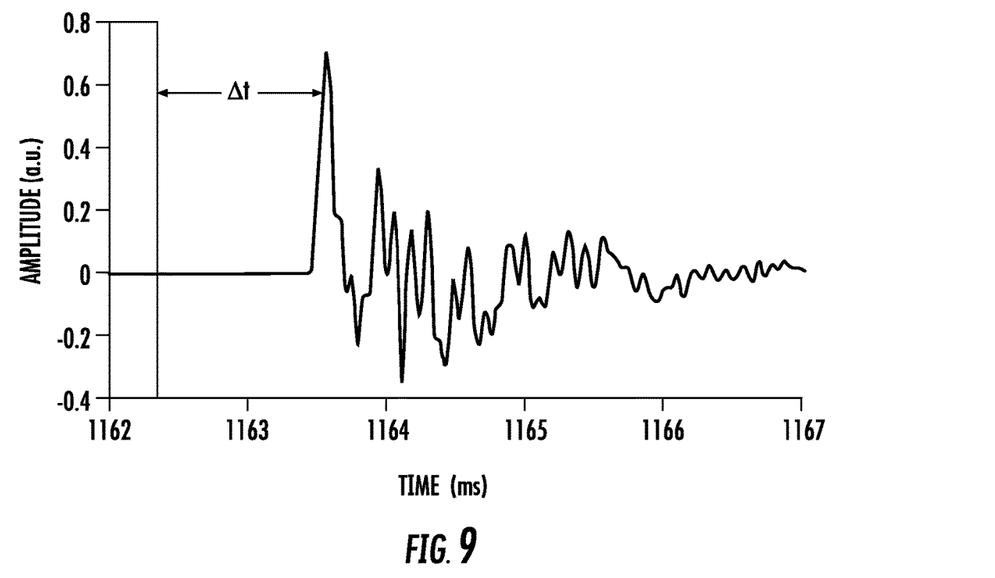
FIG. 9 is a chart illustrating acoustic dynamics and a time delay associated with an explosive stripping process performed by the optical fiber stripping apparatus, in accordance with an example.

FIG. 9 illustrates a chart including an acoustic profile line that represents a digitized acoustic signal provided by the computer device 30, in accordance with the Fourth Example. The computer device 30 can process the analog signal from the acoustic sensor 34 to provide the digitized acoustic signal. In the Fourth Example, the time delay $\Delta t$ is a positive delay, as shown in FIG. 9, wherein the shutoff time $t_0$ and the explosion time $t_e$ are identified by the opposite tips of the double-ended arrow that represents the time delay $\Delta t$ in FIG. 9. More specifically, a vertical line in the graph of FIG. 9 represents the shutoff time $t_0$, and the very well-defined, characteristic rising edge and/or initial peak in the acoustic signal illustrated in FIG. 9 represents the explosion time $t_e$. In FIG. 9, the rise time is about 100 µs, limited by the audio bandwidth of the system. The computer device 30 can be configured to identify the explosion time $t_e$ by processing the signal from the acoustic sensor 34, such as by identifying the explosion time as being the point in time at which the acoustic profile line in FIG. 9 identifies a characteristic rising edge or initial peak that exceeds a predetermined value. In one example, the rising edge is located to a precision of 1 ms. The chart of FIG. 9, features thereof and/or other suitable information may be displayed on the user interface of the computer device 30.

In the Fourth Example, the computer device 30 may initiate acquisition of the acoustic signal with the acoustic sensor 34 at about the same time the heater 14 is turned on. That is, the start of acoustic signal acquisition may be synchronized with the beginning of the electrical current pulse that is supplied to the heater 14. The acoustic sensor 34 (e.g., microphone) can be placed outside of the heating region 26 so that it does not interfere with insertion of the fiber 12 into, or removal of the fiber from, the heating region. In addition to the acoustic waveform of FIG. 9 being indicative of the explosion time $t_e$, the acoustic waveform itself can be analyzed in both time and frequency domains for features that are correlated to certain process conditions. The relative strength of the acoustic signal can be another process indicator.

Figure 10:
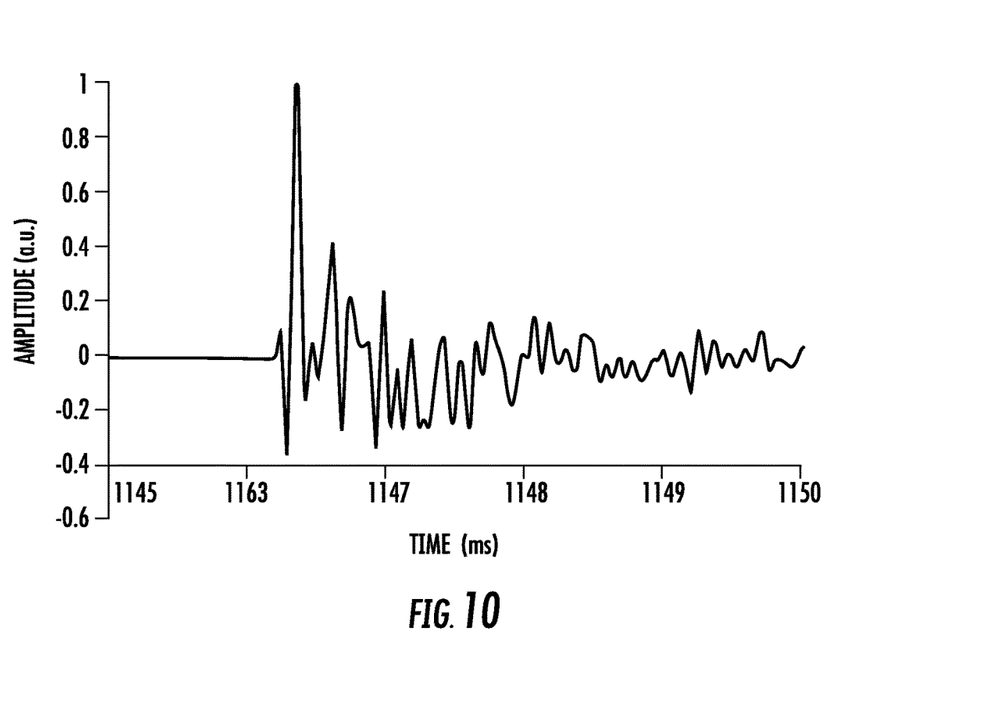
FIG. 10 is a chart that is generally similar to the chart of FIG. 9, in accordance with another example.

FIG. 10 illustrates a chart that is similar to the chart of FIG. 9, except for illustrating acoustic dynamics in accordance with another example, wherein the acoustic or time delay Δt is negative. The acoustic waveform of FIG. 10 exhibits a characteristic satellite peak before the main peak, which is indicative of the time delay Δt being negative. In the example of FIG. 10, the fiber 12 is exposed to very high temperature during and after the stripping explosion, which can reduce the fiber tensile strength.

Figure 11:
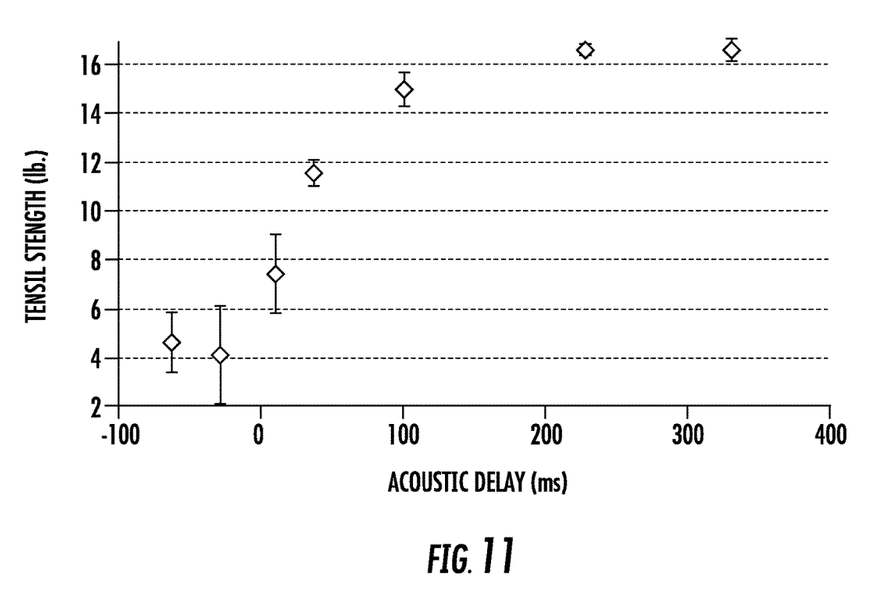
FIG. 11 is a chart indicating relationships between time delays and the tensile strength of stripped optical fibers, in accordance with an embodiment of this disclosure.

For a given current amplitude of the acoustic waveform, the fiber tensile strength can be measured as a function of the time delay Δt. FIG. 11 shows the tensile strength of stripped fibers 12 at various time delays Δt, in accordance with the first embodiment. FIG. 11 indicates a trend of fiber tensile strength degradation as the time delay Δt approaches 0 ms and lower. At time delays Δt of more than 200 ms, the fiber tensile strength is very close to that of unstripped fiber. As the fiber tensile strength is reduced to less than 10 lb, the variability also starts to increase.

Based upon visual analyses of microscope images of fibers 12 stripped in accordance with the first embodiment, residual primary coating 54 was observed when the time delay Δt was 500 ms, whereas no residual primary coating 54 was observed when the time delay was 0.0 ms. A tradeoff between fiber tensile strength and cleanliness can be found in the condition that produces 11 to 15 lb. of tensile strength. Accordingly, the optimum or acceptable time delay Δt may be in a range of from about 30 ms to about 150 ms, or from about 50 ms to about 130 ms, from about 70 ms to about 110 ms, or any other subranges therebetween.

In addition to determining the time delay Δt, the computer device 30 can be configured to provide signals in response to the determining the time delay Δt, such as a first signal for indicating that the time delay is within the acceptable range, and at least a second signal for indicating that the time delay is not in the acceptable range (e.g., failure of the explosive stripping to occur). That is, the computer device 30 may be configured to verify whether the explosive stripping process is reasonably successful. For example, if an attempt to complete the explosive stripping process totally fails (e.g., there is no explosion), the acoustic sensor 34 will fail to detect an appropriate acoustic signal, and the computer device 30 can alert the user or appropriate automated device that the explosive stripping process failed. Any signals that are supplied by the computer device 30 and are indicative of whether the explosive stripping process passed or failed the acceptance criteria may be provided to a user interface associated with the computer device.

Roughness in the secondary coating 56 and other factors may introduce variability to the explosive stripping process. The above-discussed real time feedback provided by the stripping apparatus 10 can be used to adjust the explosive stripping process. For example and as alluded to above, the shutoff time $t_0$ can be a variable that may be adjusted in response to the feedback. The time delay Δt for a pre-defined electrical current amplitude for the heater 14 may be used to profile fibers 12 with different coating types to achieve high performance stripping for the respective fiber types. The relative difference of these parameters may be extrapolated to different electrical current amplitudes. The time delay Δt may be utilized to track variations in the explosive stripping process, including fiber 12 misalignment relative to the heater 14, contamination or aging of the heater, changing ambient temperature, humidity, air pressure, etc.

The shutoff time $t_0$ or other parameters may be adjusted to bring the explosive stripping process back to the targeted, optimum or acceptable time delay Δt, to obtain the desired tensile strength and cleanliness of the stripped fibers 12. For example, the shutoff time $t_0$ may be adjusted in response to the time delay Δt. The shutoff time $t_0$ may be increased in response to the time delay Δt being greater than a predetermined amount and/or the shutoff time $t_0$ may be decreased in response to the time delay Δt being less than a predetermined amount. As another example, the computer device 30 may be configured to process the acoustic signal received from the acoustic sensor 34 in order to provide process feedbacks based on the acoustic signal's timing, amplitude, and/or waveform.

In the first embodiment, the profile of the electrical current supplied to the heater 14 may be in the form of a simple square wave. However, numerous variations are within the scope of this disclosure. For example, supplying a pre-emphasized electrical current waveform to the heater 14 can produce a temperature profile with a faster rise time, although such a waveform may require a higher current power supply 42. The duration of the electrical current pulse supplied to the heater 14 can be fixed at a certain value while varying the amplitude or duty cycle as a process control parameter.

An aspect of this disclosure is the provision of a method for real time monitoring of a non-contact, non-gas-stream thermal stripping process that seeks to provide both optimum fiber tensile strength and surface cleanliness. The time delay Δt can be monitored and calibrated against fiber tensile strength for different coatings and other variables. Monitoring the time delay Δt can also be part of a calibration method for stripping apparatuses 10 that may be used in the field or factory, wherein variations in the time delay Δt may be used as a basis for adjusting operational parameters of the stripping apparatus, such as the shutoff time $t_0$, to compensate for variations in ambient conditions. In manufacturing settings, the time delay Δt can be continuously monitored for process tracking and quality control.

In contrast to a conventional method for evaluating the quality of a stripped fiber by conducting a destructive tensile strength test, the above-discussed monitoring methods of this disclosure are non-destructive, may be carried out in real time, and can be relatively low cost.

As indicated above with reference to FIG. 1, the stripping apparatus 10 may include one or more holding mechanisms 28 configured to at least partially secure the fiber 12 so that the fiber section 60 is suitably positioned in the heating region 26 during the stripping process. In one example, the holding mechanisms 28 may be in the form of securing blocks with V-shaped grooves, other suitably shaped grooves, clips and/or other suitable supporting and/or securing features for securing the fibers 12 during stripping.

As another example, a single holding mechanism 28 may be used, wherein while the stripping apparatus 10 is being used, a fiber 12 being stripped may be supported at only one end by the holding mechanism, that the fiber extends away from the holding apparatus in a cantilevered manner. The holding mechanism 28 may include a ceramic ferrule having a central bore through which a portion of the fiber 12 extends. The ferrule may be held or supported in any suitable manner, such as manually by way of a holding tool that may be in the form of clamps or any other suitable tool.

As shown in FIG. 1, the fiber 12 extends substantially coaxially through the heating region 56. However, the stripping apparatus 10 may be configured to enable a wide position tolerance of the fiber 12 during the stripping process. For example, a variety of differently configured heaters are within the scope of this disclosure. In this regard, second and third embodiments are like the first embodiment, except for variations noted and variations that will be apparent to those of ordinary skill in the art. For example, in the second embodiment, the heater 14 may include three or more of the resistive sections 24 that are arranged side by side to one another and collectively extend at least partially around the heating region 26.

In the third embodiment, the wire 20 of the heater may be in the form of a heating coil, which may be in the form of, or substantially in the form of, a helix. The wire 20 may be in a bent configuration so that the heating coil includes multiple loops that are arranged in a series that extends between opposite ends of the coil. The heating coil may extend completely around and concentrically along the heating region 26.

Whereas the stripping apparatuses 10 of the first through third embodiments typically does not use forced convection to heat the multi-layer coating 58, the stripping apparatuses my optionally include a fan or other suitable air mover. For example, the fan may be is turned on after the heater 14 is turned off, to increase the speed at which the heater is cooled, in order to increase the cycle time of the stripping process. An air filter may be associated with the fan for collecting any decomposed coating gas.

The control and monitoring system 16 (e.g., the computer device(s) 22) may include processing circuitry, such as processing circuitry of a computer, that is configurable to perform actions in accordance with one or more exemplary embodiments disclosed herein. In some exemplary embodiments, the processing circuitry may include a processor and memory. The processing circuitry may be in communication with or otherwise control, for example, a user interface, and one or more other components, features and/or modules (e.g., software modules). The user interface can include an activating feature, such the actuation switch 36 or icon, or the like, for being actuated by a user to initiate the stripping process. The processor may be embodied in a variety of forms. For example, the processor may be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. The processor may comprise a plurality of processors. Whether configured by hardware or by a combination of hardware and software, the processor is capable of performing operations according to various embodiments of this disclosure. The control and monitoring system 16 (e.g., the computer device(s) 22) may comprise a field effect transistor (FET) which is gated by a programmable pulse generator.

In one example, at least part of the control and monitoring system 16 may be a portable handheld device that may be in some ways similar to or associated with a smartphone, or the like. For example, the sound of the explosive stripping may be sufficient to saturate a closely positioned acoustic sensor 34 that is in the form of a consumer microphone, which may optionally be part of a smartphone or other suitable device. If there is loud ambient noise, the stripping apparatus 10 can be enclosed in a sound-insulated environment. In addition, the explosive stripping may provide a well-defined acoustic signature, such that the computer device 30 can execute software for filtering out the ambient noise or interference.

Persons skilled in fiber stripping or optical connectivity will appreciate additional variations and modifications of the devices and methods already described. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is no way intended that any particular order be inferred.

The above examples are in no way intended to limit the scope of the present invention. It will be understood by those skilled in the art that while the present disclosure has been discussed above with reference to examples of embodiments, various additions, modifications and changes can be made thereto without departing from the spirit and scope of the invention as set forth in the claims.

What is claimed is:

1. A method for removing at least one coating from a lengthwise section of an optical fiber, the method comprising:
    positioning the lengthwise section of the optical fiber in an elongate heating region between resistive sections of a heater;
    explosively removing the at least one coating of the lengthwise section from a remainder of the optical fiber, comprising operating the heater to heat the at least one coating of the lengthwise section of the optical fiber by way of natural convection to a temperature above a thermal decomposition temperature of the at least one coating while the lengthwise section of the optical fiber is in the heating region;
    generating at least one signal indicative of the explosively removing of the at least one coating;
    processing the at least one signal; and
    deactivating the heater.

2. The method of claim 1, wherein the processing is comprised of determining how much time passes between occurrence of the heater being deactivated and the explosively removing of the at least one coating.

3. The method of claim 2, wherein the determining of how much time passes is comprised of:
    determining a time at which the heater is deactivated;
    determining a time at which the at least one coating is explosively removed; and
    calculating a difference between the time at which the heater is deactivated and the time at which the at least one coating is explosively removed.

4. The method of claim 2, further comprising providing a signal if the amount of time which passes between occurrence of the heater being deactivated and the explosively removing of the at least one coating is outside of a predetermined range.

5. The method of claim 1, further comprising deforming the at least one coating prior to the explosively removing of the at least one coating.

6. A method for removing at least one coating from a lengthwise section of an optical fiber, the method comprising:
    positioning the lengthwise section of the optical fiber in an elongate heating region between resistive sections of a heater;
    explosively removing the at least one coating of the lengthwise section from a remainder of the optical fiber, comprising operating the heater to heat the at least one coating of the lengthwise section of the optical fiber by way of natural convection to a temperature above a thermal decomposition temperature of the at least one coating while the lengthwise section of the optical fiber is in the heating region;
    deactivating the heater; and
    determining how much time passes between occurrence of the heater being deactivated and the explosively removing of the at least one coating.

7. The method of claim 6, wherein the deactivating of the heater is comprised of deactivating the heater at a predetermined time after activation of the heater.

8. The method of claim 7, further comprising adjusting the predetermined time in response to the determining of how much time passes between occurrence of the heater being deactivated and the explosively removing of the at least one coating.

9. The method of claim 8, wherein the adjusting of the predetermined time is comprised of at least one step selected from the group consisting of:
increasing the predetermined time in response to the amount of time passing between the occurrence of the heater being deactivated and the explosively removing of the at least one coating being greater than a predetermined amount; and
decreasing the predetermined time in response to the amount of time passing between the occurrence of the heater being deactivated and the explosively removing of the at least one coating being less than a predetermined amount.

10. The method of claim 6, wherein the determining of how much time passes is comprised of:
determining a time at which the heater is deactivated;
determining a time at which the at least one coating is explosively removed; and
calculating a difference between the time at which the heater is deactivated and the time at which the at least one coating is explosively removed.

11. The method of claim 6, wherein the determining of how much time passes is comprised of:
activating a timer in response to the heater being deactivated; and
deactivating the timer in response to the exploding of the at least one coating.

12. The method of claim 6, wherein the determining of how much time passes is comprised of:
activating a timer in response to the exploding of the at least one coating; and
deactivating the timer in response to the heater being deactivated.

* * * * *